United States Patent [19]

Kordic

[11] Patent Number: 5,508,049
[45] Date of Patent: Apr. 16, 1996

[54] PIZZA PIE WITH CONCENTRIC RINGS OF CRUST

[75] Inventor: Branko Kordic, Chardon, Ohio

[73] Assignee: Silverback Environments, Inc., Chardon, Ohio

[21] Appl. No.: 445,386

[22] Filed: May 19, 1995

Related U.S. Application Data

[62] Division of Ser. No. 80,081, Jun. 18, 1993, Pat. No. 5,417, 150.

[51] Int. Cl.⁶ ................................................. A21D 13/00
[52] U.S. Cl. ........................ 426/94; 426/138; 426/144; 426/283; 426/391; 426/496; 426/512; 99/432; 99/DIG. 15
[58] Field of Search ...................... 99/432, D15; 426/94, 426/138, 283, 391, 502, 503, 496, 512, 144; D1/130, 129, 128, 127

[56] References Cited

U.S. PATENT DOCUMENTS

| | | | |
|---|---|---|---|
| D. 311,304 | 10/1990 | Virk | D7/672 |
| D. 315,849 | 4/1991 | Brunner | D7/672 |
| 883,296 | 3/1909 | Cook | 99/430 |
| 1,888,562 | 11/1932 | Trompter | 426/391 |
| 3,098,597 | 7/1963 | Johnson et al. | 99/DIG. 15 |
| 3,166,027 | 1/1965 | Sprenzel | 425/183 |
| 3,194,185 | 7/1965 | Spinosa | 426/556 |
| 3,322,074 | 5/1967 | Malnory | 425/195 |
| 3,473,489 | 10/1969 | Sargent | 426/275 |
| 3,864,071 | 2/1975 | La Monica | 425/470 |
| 4,081,169 | 3/1978 | Lauter | 249/115 |
| 4,184,421 | 1/1980 | Ahlgren | 99/450 |
| 4,606,923 | 8/1986 | Ricke | 426/496 |
| 4,955,125 | 9/1990 | Steinman | 29/509 |
| 5,004,121 | 4/1991 | Howe | 220/458 |
| 5,253,565 | 10/1993 | Burton | 99/374 |

FOREIGN PATENT DOCUMENTS

| | | |
|---|---|---|
| 0315452A1 | 5/1989 | European Pat. Off. . |
| 91 08 985.9 | 7/1991 | Germany . |

OTHER PUBLICATIONS

Supplementary Search Report in EPO Case No. 94920235.2.
Copy of pages from book entitled "Pizza", by James McNair, Copyright 1987, pp. 32, 33.

*Primary Examiner*—Donald E. Czaja
*Assistant Examiner*—Lien Tran

[57] ABSTRACT

A pizza mold for forming pizza dough includes a frame having a peripheral configuration which matches the desired peripheral configuration of the dough, e.g., round, rectangular or square. One surface of the frame includes a plurality of concentric cavities formed at predetermined radial distances from the geometric axis of the frame, with one concentric cavity being formed adjacent the peripheral edge of the frame. The frame is designed to be brought into contact with the dough and the dough is formed (e.g., rolled) across the surface of the frame with the dough being formed in the concentric cavities. When the pizza mold is removed, the concentric cavities produce raised ridges of dough on the surface of the dough. The cavities can be formed in rings across the surface of the frame to create annular raised ridges for a round pizza, or the cavities can be formed in rectangles or squares across the surface of the frame to create rectangular or square raised ridges for a rectangular or square pizza. Toppings such as cheese, meat and/or vegetables, can be located between adjacent raised ridges on the dough. When the pizza dough is cooked, the raised ridges on the dough form crust across a significant portion of the pizza.

6 Claims, 2 Drawing Sheets

PIZZA PIE WITH CONCENTRIC RINGS OF CRUST

This is a divisional of application Ser. No. 08/080,081 filed on Jun. 18, 1993, now U.S. Pat. No. 5,417,150.

FIELD OF THE INVENTION

The present invention relates generally to dough forming device and more particularly to a pizza mold for forming a plurality of concentric raised ridges of dough (i.e., crust) on the surface of a pizza pie.

BACKGROUND

Pizza making has become a successful industry serving countless individuals. Pizza pies typically have an annular (round) configuration, although square and rectangular-shaped pizzas are also known and have had some recent acceptance in the consumer market. Toppings such as cheese, meat, and/or vegetables are distributed across the surface of the pizza pie within the area bounded by the crust, and the pie is baked in an oven for a short period of time. After the cooked pizza is removed form the oven, the pizza is sliced into, e.g., wedges or squares.

While automation in the industry has brought rapid and efficient means for mixing, kneading and cooking the pizza dough into a finished pizza pie, it is applicant's belief that there has been little innovation in the configuration of the pizza pie itself (besides the above-mentioned square or rectangular peripheral configurations). In applicant's experience, the pizza pie includes a substantially flat central surface area with a raised crust around only the outer peripheral edge of the pie. When the pizza is sliced, only a small segment of crust accompanies each slice of pizza. Moreover, if the pizza is sliced into squares, it is possible that the inner squares of the pie will fail to have any crust on them whatsoever.

Applicant believes that there is a consumer demand for a pizza pie which has crust formed at locations other than just around the outer peripheral edge of the pie, such that almost any slice of pizza (be it wedge-shaped or square-shaped) will preferably have multiple segments of crust accompanying it. Applicant believes that such a pizza pie has better texture, flavor, and aesthetic appeal.

Certain dough forming devices and techniques are already known in the art, some of which are applicable to pizza pies. For example, Sprenzel U.S Pat. No. 3,166,027; Spinosa U.S. Pat. No. 3,194,185; Malnory U.S. Pat. No. 3,322,074; LaMonica U.S. Pat. No. 3,864,071; and Lauter U.S. Pat. No. 4,081,169, disclose molds and frames for forming dough into a flat, round configuration, such as typically found with pizza pies. Further, U.S. Pat. No. 883,296 and U.S. Pat. No. Des. 311,304 disclose molds for forming wedge-shaped slices in flattened, round dough. However, none of the prior devices and techniques address the problem of having only a single segment of crust (or no crust at all) on each slice of pizza.

SUMMARY OF THE INVENTION

The present invention provides a new and useful pizza mold for pizza dough which forms a plurality of concentric raised ridges in the dough. The mold is particularly useful for forming concentric ridges of crust on a pizza pie such that practically every slice of the pizza has multiple segments of crust to improve the texture, flavor and aesthetic appeal of the pie.

The pizza mold of the present invention includes a frame having a peripheral configuration which matches the desired peripheral configuration of the dough. The mold can be round, square or rectangular, depending on whether the finished pizza pie is to be round, square or rectangular. The frame has a plurality of concentric dough cavities formed across the surface of the frame at predetermined radial distances from the geometric axis of the frame. The concentric cavities are preferably spaced at equal intervals and have the same configuration as the mold, e.g., round, square or rectangular. Further, an outer lip extends outwardly around the peripheral edge of the frame to provide a defined area for the pizza dough.

When the mold is brought into contact with the dough, the dough is formed (e.g., rolled) across the surface of the mold within the defined area. Excess dough extending across the lip on the mold is then removed. When the mold is removed, raised ridges on the dough remain in the dough corresponding to the concentric dough cavities in the mold. If the dough is used to form a pizza pie, toppings such as cheese, meat and/or vegetables can be located between adjacent raised ridges on the pie. After the pizza dough is cooked, the raised ridges form crust on the pie at multiple locations across the pie for the pizza-eater's enjoyment.

It is therefore an advantage of the present invention to provide a dough forming device— preferably for pizza dough—which forms raised ridges of dough on areas other than just the edge of a pizza pie to improve the texture, flavor and aesthetic appeal of the pizza pie.

Other advantages of the present invention should become apparent upon reading the following specification and appended claims

DETAILED DESCRIPTION OF THE PREFERRED EMBODIMENT

Figure 1:
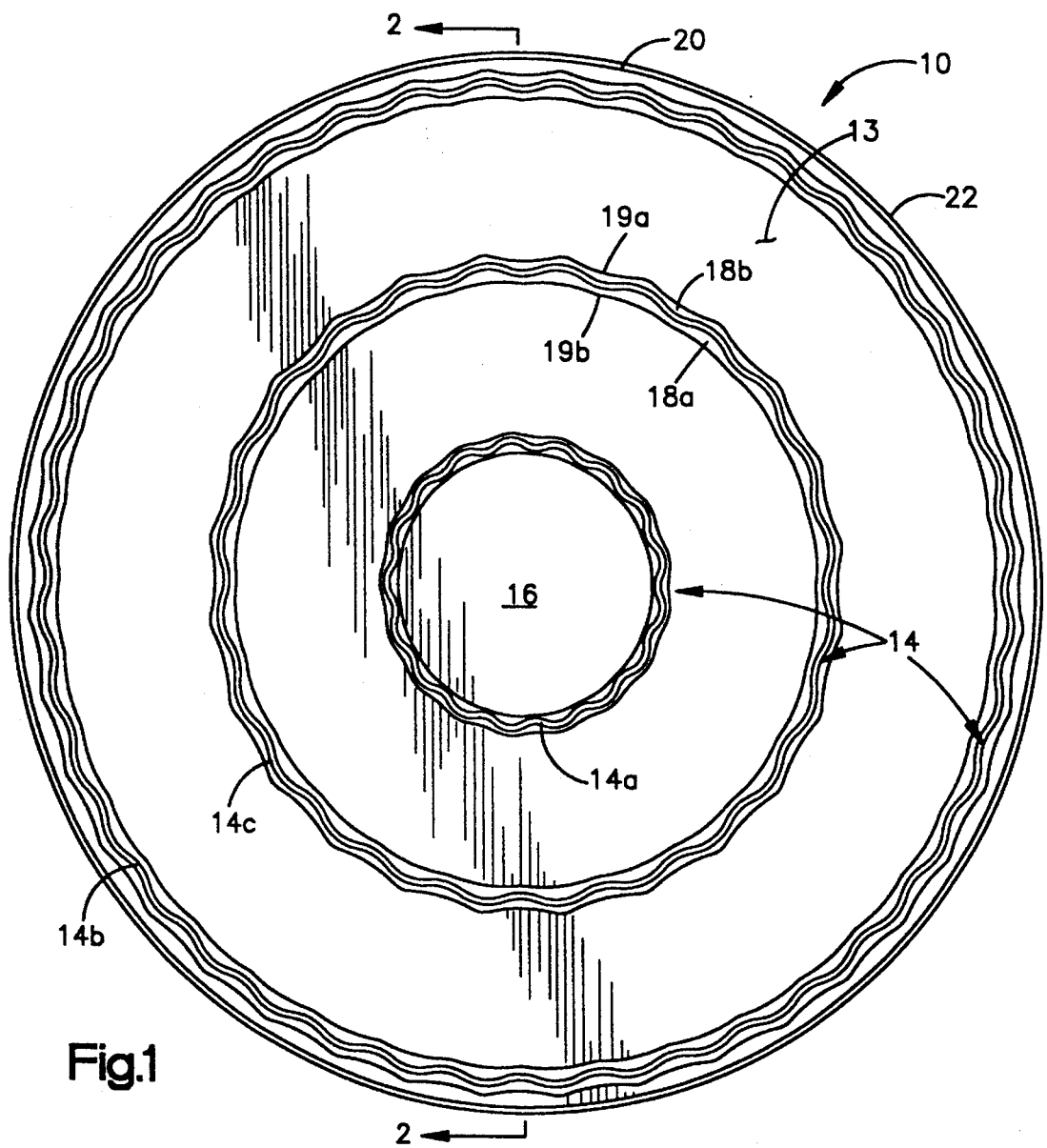
FIG. 1 is a perspective view of an annular pizza mold formed in accordance with the principles of the present invention.
Figures 2, 4:
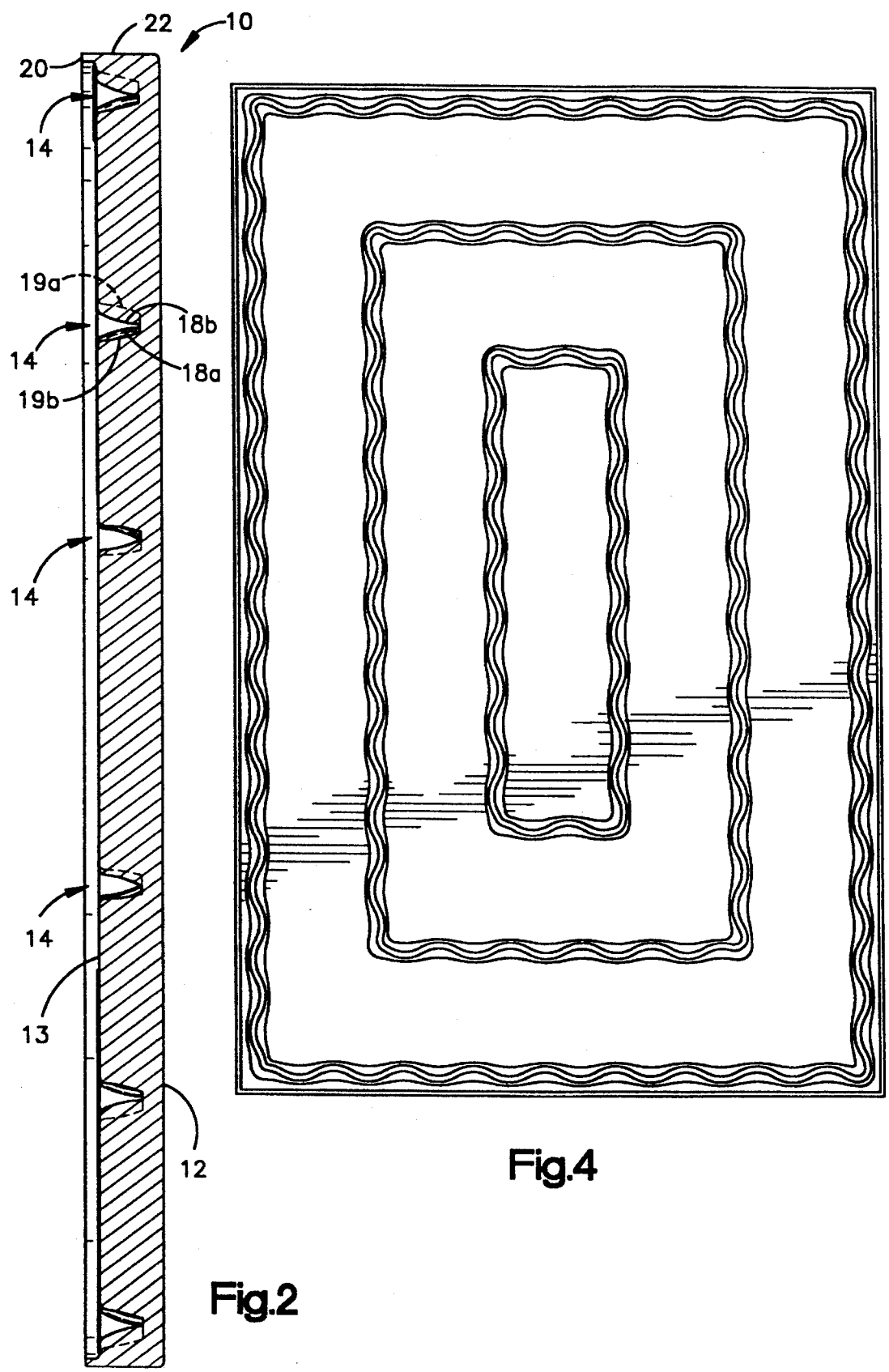
FIG. 2 is a cross-sectional side view of the annular pizza mold taken substantially along the plane described by the lines 2—2 of FIG. 1.
FIG. 4 is a pizza pie formed similar to that of FIG. 3, but using a rectangular pizza mold.

Referring to the drawings, and initially to FIGS. 1 and 2, a pizza mold, indicated generally at 10, is shown for forming raised ridges in pizza dough. It should be apparent to those skilled in the art upon reading the following description, however, that the principles of the present invention can also be applied to forming dough other than pizza dough, for example, bread or cake dough. Such alternative uses are therefore within the scope of the present invention. As such, the terms "pizza mold" and "pizza dough" are not intended to be limiting the present invention to only forming pizza pies. Rather, the principles of the present invention are applicable to any type of dough which can be formed using the following described techniques.

The pizza mold 10 comprises a frame 12 having a predetermined peripheral configuration. In FIGS. 1 and 2, the frame 12 has a disc-shaped annular configuration; however, the frame 12 could just as well have other geometric configurations, such as rectangular or square configurations. As will be described herein in more detail, the peripheral configuration of the frame (or at least the dough forming structure on the frame) determines the final configuration of the pizza pie. Hence, the configuration of the frame is typically dictated by the desired configuration of the pizza pie.

The frame 12 is formed from an appropriate material which is compatible with food products, for example stainless steel or plastic-injected fiberglass. The frame can have an appropriate coating thereon for the contacting surface, such as a spray-coating or layered coating, to maintain sanitary conditions. Alternative material for the pizza mold of the present invention should also be apparent to those skilled in the art, as long as the material complies with all relevant food-handling codes and regulations.

The frame of the pizza mold has a flat bottom surface 13 with a series of preferably concentric dough cavities, indicated generally at 14, formed at predetermined distances from the geometric axis 16 of the frame. For an annular frame, the concentric dough cavities can be formed in annular configurations having increasing radii across the surface of the frame. For example, as illustrated in FIG. 1, an inner dough cavity 14a can be located closest to the geometric axis 16 of the mold, an outer dough cavity 14b can be located proximate the peripheral edge of the pizza mold, and a middle dough cavity 14c can be interposed between inner dough cavity 14a and outer dough cavity 14b.

For a pizza pie of approximately 15 inches in diameter (i.e., a "medium" pizza pie), preferably three concentric dough cavities are used on the pizza mold. On the other hand, for a pizza pie of approximately 10 inches in diameter (i.e., a "small" pizza pie), preferably only two concentric dough cavities are used. It is also preferred that one dough cavity be located adjacent the peripheral edge of the mold and that the dough cavities are located approximately two inches apart from each other in the radial direction. The number and location of dough cavities formed in the mold can also vary depending upon the particular application; however, in general, enough space should be left between adjacent dough cavities such that toppings can be easily added between adjacent raised ridges of dough on the pizza pie, as will be described herein in more detail.

It is preferred that the depth of each dough cavity be between about ¾ and 1" deep, while the width of each dough cavity be about ¾ wide. The dimensions of the dough cavities 14, however, can also vary depending upon the particular pizza pie. The dough cavities can also have a rounded cross-sectional configuration, or can be pointed or wedge-shaped. If desired, each dough cavity can also include a series of indents 18a, 18b, formed at even, spaced-apart locations along the inner wall 19a and the outer wall 19b, respectively, of each cavity. The indents 18a on inner wall 19a can be located in staggered offset relation to indents 18b on outer wall 19b so as to form an aesthetically pleasing "crimped" shape on the dough after the dough has been formed into the mold.

Finally, a lip 20 is formed along the peripheral edge 22 of the pizza mold and defines a sidewall of the outermost dough cavity 14b. The lip extends outwardly from the bottom surface of the mold to facilitate forming the dough into the configuration of the pizza mold. Preferably, the lip extends outwardly about ¼" beyond the bottom surface of the mold.

As described above, the pizza mold is preferably a one-piece disc with a flat bottom surface. However, it is also within the scope of the invention to form the mold from more than one piece, if desired. Also, although the dough cavities are shown as being concentric with the geometric axis of the pizza mold, it is also within the scope of this invention to form the dough cavities off-center, or in other configurations, for example as stripes across the frame. In fact, in its broadest sense, the present invention is directed toward forming some configuration of raised ridges on the pizza dough at locations other than just around the peripheral edge of the pizza dough.

The ingredients for the pizza dough for the present invention are, of course, conventional in nature. The pizza dough typically includes water or milk, flour or meal, and yeast. The ingredients are mixed and kneaded as appropriate to provide a mound of dough. The dough can then be rolled flat and placed into the pizza mold in contact with the bottom surface. The dough is then formed flat across the surface of the pizza mold, such as by using a rolling pin (not shown). Alternatively, the mold can also be pressed against the flattened dough similar to the action of a cookie-cutter, or the pizza mold can be incorporated into automated machinery which would perform the same forming process as described above. In any case, the dough is formed into the concentric dough cavities and conforms substantially thereto. The lip 20 of the mold generally forms the outer peripheral configuration of the dough when the dough is formed, and any excess dough extending across the lip can be trimmed off.

Figure 3:
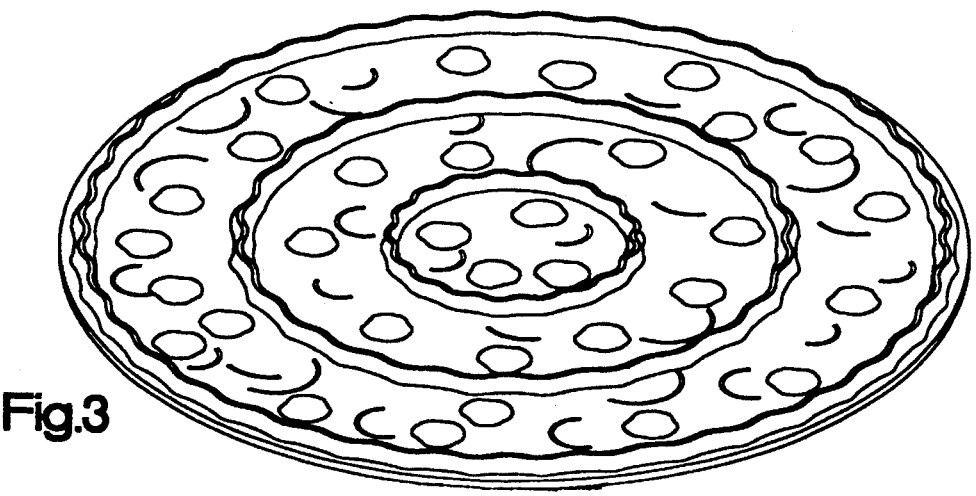
FIG. 3 is a pizza pie formed using the annular pizza mold of FIG. 1.

When the pizza mold is removed, the pizza has a generally annular configuration corresponding to the configuration of the mold, such as illustrated in FIG. 3. The concentric dough cavities in the pizza mold form annular raised dough ridges on the surface of the pizza dough which correspond to the location of the dough cavities in the mold.

After the pizza mold has been formed as described previously, appropriate toppings, e.g., cheese, meat and/or vegetables can be located between adjacent raised dough ridges on the surface of the pizza dough. Each topping can be located across the entire pizza, or a different topping can be located in each concentric "ring". One advantage of having adjacent raised dough ridges spaced two inches apart is that many commercially-available pepperoni sticks have almost a two inch diameter, so that the pepperoni slices fit nicely between the adjacent dough ridges when the toppings are added. The annular raised ridges thereby also facilitate the placement of toppings on the pizza pie in an orderly manner.

When the pizza dough having the plurality of raised ridges is baked in an oven (using conventional baking techniques), the raised dough ridges form a crust across a significant portion of the pie. When the pizza pie is sliced into normal-sized pieces, practically every slice of pizza has at least one segment of crust on it other than the crust around the peripheral edge. In fact, most slices should have numerous segments of crust thereon at spaced-apart locations on the slice. The additional crust on the slices of pizza adds texture, flavor and aesthetic appeal to the cooked pizza.

As indicated above, the principles of the present invention are preferably directed toward a round pizza pie as illustrated in FIG. 3. However, the principles can also be used to form pizza pies in other configurations, such as rectangular as illustrated in FIG. 4, or square. In FIG. 4, the raised ridges of the dough have a rectangular configuration at predetermined distances from the geometric axis of the pizza. Again, toppings can be located between the raised ridges on the pizza dough when making a pizza pie. All other design aspects are for a rectangular or square pizza mold are the same as discussed previously with respect to the round pizza mold. For example, for a rectangular or square frame, the dough cavities can be formed in rectangular or square configurations across the surface of the frame. Additionally, the frame can have a rectangular or square peripheral configuration, depending upon the desired peripheral configuration of the pizza.

As indicated above, the present invention provides a new and useful mold for forming dough products such as pizza dough. Although the invention has been described in its preferred form with a certain degree of particularity, it is understood that the present disclosure has been by way of example, and that numerous changes in the details of construction and the combination and arrangements of parts may be resorted to without departing from the spirit and scope of the invention as hereinafter claimed. It is intended that the patent shall cover, by suitable expression in the appended claims, whatever features of patentable novelty exists in the invention disclosed.

What is claimed is:

1. A pizza pie, comprising:

a substantially flat piece of cooked pizza dough having a predetermined peripheral configuration, said piece of cooked pizza dough having a surface which includes a plurality of concentric raised ridges of crust formed at predetermined distances from a linear geometric axis which passes through a center of the pizza dough in a direction which is substantially perpendicular to the substantially flat piece of cooked pizza dough, with one of said concentric raised ridges of crust being adjacent a peripheral outer edge of the pizza pie.

2. The pizza pie as in claim 1, further including a topping located on the surface of the pizza pie between adjacent concentric raised ridges of crust.

3. The pizza pie as in claim 1, wherein said pizza dough has an annular peripheral configuration and said raised ridges of crust are formed in concentric annular configurations in the pizza dough at predetermined radial distances from the linear geometric axis of the dough.

4. The pizza pie as in claim 1, wherein said pizza dough has a square or rectangular configuration and said raised ridges of crust are formed in square or rectangular configurations in the pizza dough at predetermined distances from the linear geometric axis of the pizza dough.

5. A pizza pie, comprising:

a substantially flat piece of cooked pizza dough having a predetermined peripheral configuration, said piece of cooked pizza dough having a surface which includes i) a first raised ridge of crust adjacent to and extending entirely around a peripheral outer edge of the pizza dough, and ii) at least one other raised ridge of crust formed at a predetermined distance inwardly from the peripheral edge of the pizza dough and extending along an extent of the surface of the pizza dough.

6. The pizza pie as in claim 5, wherein said at least one other raised ridge of crust extends across the surface of the pizza dough in a configuration which matches the peripheral configuration of the pizza dough.

* * * * *